No. 774,995. PATENTED NOV. 15, 1904.
J. SPEIR.
BICYCLE HOLDER OR SUPPORT.
APPLICATION FILED MAR. 16, 1904.
NO MODEL.
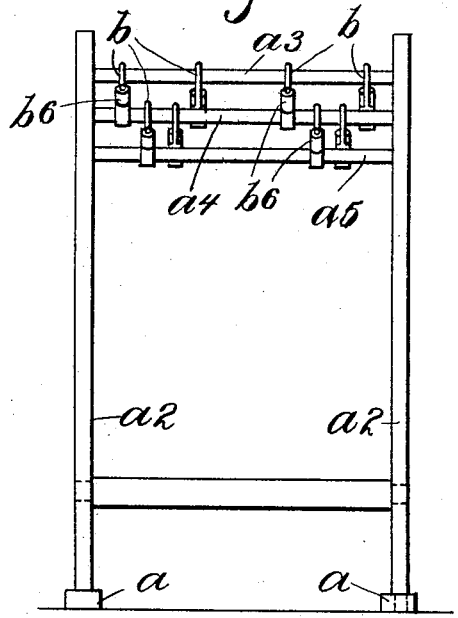
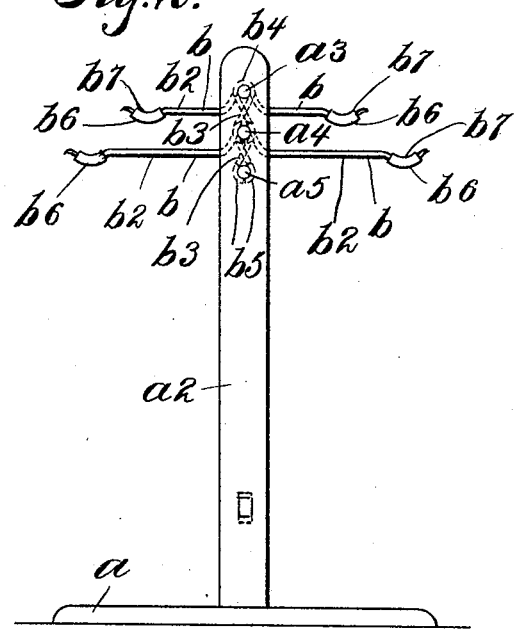
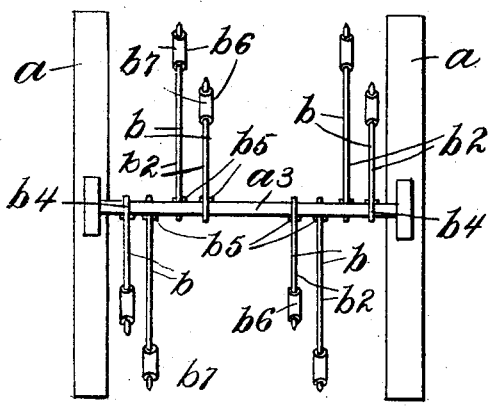
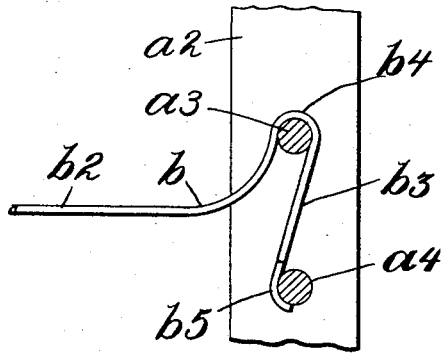
WITNESSES
A. B. Mattingly
F. A. Stewart
INVENTOR
James Speir.
BY Edgar Tate & Co
ATTORNEYS No. 774,995.

Patented November 15, 1904.

UNITED STATES PATENT OFFICE.

JAMES SPEIR, OF HARROGATE, ENGLAND.

BICYCLE HOLDER OR SUPPORT.

SPECIFICATION forming part of Letters Patent No. 774,995, dated November 15, 1904.

Application filed March 16, 1904. Serial No. 198,370. (No model.)

*To all whom it may concern:*

Be it known that I, JAMES SPEIR, a subject of the King of Great Britain, residing at Bondi, Westcliffe Mount, Harrogate, England, have invented certain new and useful Improvements in Bicycle Holders or Supports, of which the following is a specification, such as will enable those skilled in the art to which it appertains to make and use the same.

The object of this invention is to provide an improved device or apparatus for supporting or holding bicycles and economizing space in houses or warehouses where bicycles are kept or in railway-vans or other vehicles, or ships, so that the bicycles may be safe from injury; and with this and other objects in view the invention consists in a device or apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a front view of a bicycle support or holder embodying my invention; Fig. 2, a side view thereof; Fig. 3, a plan view thereof, and Fig. 4 a sectional side view of a part thereof.

In the practice of my invention I provide a frame comprising a base, which in the form of construction shown is composed of two parts $a$ and provided with upright side members $a^2$, which are connected at the top by cross rods or bars $a^3$, $a^4$, and $a^5$, arranged in a vertical plane. The top rod or bar $a^3$ in the form of construction shown is provided with four arms $b$, which project at right angles thereto and two of which project in one direction and two in an opposite direction, and these arms are composed of small rods bent to form two parts $b^2$ and $b^3$, connected by an upwardly-directed loop $b^4$, through which the top rod or bar $a^3$ passes, and the part $b^3$ extends downwardly and is provided with a hook member $b^5$, which engages the rod or bar $a^4$, as shown in Fig. 4, and holds the part $b^2$ in a horizontal position, and the part $b^2$ is provided at its end with a downwardly-curved loop portion $b^6$, on which is placed a sleeve $b^7$, of soft rubber or other suitable material.

The rod or bar $a^3$ in the form of construction shown is provided with four of the arms $b$, two of which project in one direction and two in the opposite direction, and these arms are in all respects similar to the arms with which the top rod or bar $a^3$ is provided, the downwardly-directed members $b^3$ thereof engaging the bottom rod or bar $a^5$.

In practice the bicycles are suspended from the loop members $b^6$ at the ends of the arms $b$, which engage one of the rods of the frame of the bicycle, and the bicycles are supported so that the frames thereof are parallel with the rods or bars $a^3$, $a^4$, and $a^5$ of the frame or holder.

My invention is not limited to the number of the arms $b$ employed in connection with the rods or bars $a^3$ and $a^4$, and any desired number of said arms may thus be employed, and the frame or holder may be made of any desired width, and the arms $b$, which are connected with the top rod or bar $a^3$, are shorter in the form of construction shown than the arms $b$, which are connected with the second rod or bar $a^4$, the object of this construction being to provide means whereby the bicycle-frames will not interfere with each other when suspended from the arms connected with the separate rods or bars $a^3$ and $a^4$. It will also be apparent that the arms $b$ are adjustable longitudinally of the rods or bars $a^3$, $a^4$, and $a^5$, and any desired number of said arms may be employed in connection with said rods or bars. It will be observed that the arms $b$ may be disconnected from the support whenever desired and again easily connected therewith whenever necessary. The base or foot portion $a$ may be made so as to be folded up at one side thereof, if desired, so that the holder or support may be placed adjacent to a wall, in which event the arms $b$ would only project in one direction from said holder or support. It will also be apparent that my invention is not limited to the main frame herein shown for supporting the parallel rods or bars $a^3$, $a^4$, and $a^5$, and said rods or bars may be supported by wall-brackets or in any desired manner, so as to leave the floor-space free and unobstructed, and the shorter arms $b$ may be connected with the second rod or bar $a^4$ and the longer arms $b$ with the top rod or bar $a^3$, if desired, and in practice two of the arms $b$, which project in the same direction, are employed for suspending a single bicycle, and the arrangement of these arms may be such as to suspend either a lady's or gentleman's bicycle, as may be desired.

My improved bicycle-holder may be made of any desired material, and the separate parts thereof or the arms $b$ and the rods or bars $a^3$, $a^4$, and $a^5$ may also be made of any preferred dimensions.

Having fully described my invention, what I claim as new, and desire to secure by Letters Patent, is—

1. A bicycle holder or support provided with three parallel rods or bars arranged one above another the top rod or bar and the middle rod or bar being provided with arms which are slidably connected therewith and which project at right angles thereto, said arms being composed of rods bent to form upwardly-directed loops through which the top rods or bars pass and downwardly-directed brace members whereby the arms connected with the top rod or bar engage the rod or bar thereunder, and the arms which are connected with the middle rod or bar also engage the rod or bar thereunder, the said arms on the top and middle rod or bar being also of different lengths, substantially as shown and described.

2. In a bicycle holder or support, a plurality of parallel rods arranged horizontally and one above another, one of said rods being provided with a plurality of detachable arms, said arms being bent at one end to form upwardly-directed loops through which said rod is passed and downwardly-directed brace members which engage the rod thereunder, substantially as shown and described.

In testimony that I claim the foregoing as my invention I have signed my name, in presence of the subscribing witnesses, this 3d day of March, 1904.

JAMES SPEIR.

Witnesses:
WM. GOODALL CHAMBERS,
CHAS. GILLIARD.